Patented June 9, 1936

2,043,443

UNITED STATES PATENT OFFICE 2,043,443

METHOD OF TREATING AND ROASTING COFFEE

George L. N. Meyer, Milwaukee, Wis.

No Drawing. Application February 8, 1933, Serial No. 655,765

3 Claims. (Cl. 99—68)

This invention relates to a new and improved process for treating raw coffee beans so as to deliver to the ultimate consumer a product having greatly improved qualities.

One object of the present invention is to provide improved means for treating the raw or green coffee bean prior to roasting to rid it of certain undesirable constituents.

A further object is to provide a new and improved process in which the desirable constituents, those producing the fine flavor and aroma, which become manifest during the roasting process are retained without the slightest degree of loss.

Another object of my invention is the provision of a new and improved process in which the coffee is roasted in salable containers.

Numerous attempts have been made in the past to accomplish the first named object and considerable progress has been made to rid coffee of certain undesirable constituents, the "astringent principle", by means of one of several well known aging processes.

Also numerous attempts have been made to provide means whereby the "aromatic principle" in coffee might be retained after roasting. These attempts have been confined solely to improved packing methods, well known to the public.

The inherent qualities of the raw and roasted coffee bean are well known and the effect of these qualities upon the beverage is also well known. The raw bean contains an "astringent principle", which when retained through the roasting process, gives to the coffee brewed therefrom a decided astringency which is undesirable. The roasted bean contains the "aromatic principle", which in spite of prolonged research has not been definitely determined. It has been variously termed as caffeol, caffeone, and the essential oil of coffee. However, it is understood to be a complex compound which gives to the coffee its fine aroma and flavor.

It has been discovered that the "aromatic principle" of coffee is quickly lost after the roasting process and as a result coffee which has been retained for any length of time after roasting becomes stale or rancid, and the brew made therefrom is of a distinctly inferior quality to that made from freshly roasted coffee. The accepted belief regarding this loss of flavor and aroma is that oxidation occurs and that destructive bacteriological actions are also present.

By means of my new and improved process, particularly the roasting of coffee in sealed salable containers, I am able to eliminate all possibility of loss of the highly desirable "aromatic principle", and thus deliver to the consumer a greatly improved product having finer aroma and flavor.

Summing up the process briefly, it may be stated that it affords a new and improved means for the elimination or control of the "astringent principle", in the raw bean; means whereby the "aromatic principle" is retained after roasting; and means for the roasting of coffee in sealed salable containers.

Other objects and advantages will appear from the following description of my method and process.

My invention may be carried out in substantially the following manner. The first step taken is to remove the "astringent principle" from the raw bean. This I accomplish by heating the coffee to a temperature ranging from 250 to 275 degrees Fahrenheit and retaining this temperature for a period of from fifteen to thirty minutes. Both temperature and time elements will of course vary in accordance with the varied requirements of the several kinds and qualities of coffee to be treated. I have found that the temperature range above indicated is sufficiently high to volatilize the "astringent principle" in the raw bean without initiating the volatilization of the "aromatic principle". The above mentioned heating is preferably effected in a container which is open to the atmosphere so as to insure the release of the "astringent principle". This heating process serves a dual purpose; firstly, it volatilizes the "astringent principle" found in the raw bean and, secondly, the exposure to heat rids the bean of a large percentage of its moisture content. This torrefaction, or drying of the bean, is of vital importance as it facilitates the grinding operation subsequently performed and further, reduces the moisture content of the coffee so treated to an amount which is sufficiently low as to prevent the building up of excessive pressure in the sealed containers when the coffee is carried through the roasting process. Obviously, more than one method may be utilized in this step. The bean may either be whole or ground upon admission to the vessel and it may likewise be removed, ground or reground and again subjected to the above mentioned temperature to further the removal of the "astringent principle." In some instances, I have found upon grinding or regrinding coffee thus treated that a sufficient quantity of the "astringent principle" remained to give off an obnoxious odor and only by regrinding and reheating could it be reduced to a quantity which was not deleterious to the final brew of coffee. I therefore specifically do not limit myself to the single heating operation either upon the whole or ground bean.

After the coffee has been treated in the above described manner, I place the ground product in salable sealed containers and proceed to roast the same. For the purpose of more expeditiously carrying out this process I have chosen to use glass containers (such as a bottle provided with a suitable seal or crown cap) which will readily withstand the pressure developed during the roasting process. The utilization of a glass container is advantageous in more than one sense. It provides a means for visibly checking the progress of the roasting process and further insures against metal contamination which might exist should such containers be utilized. During the process of roasting the containers are revolved, rotated, or agitated so as to insure an even roast of the product within the container. In sealing these containers prior to roasting, I prefer to remove as much air as feasible, so as to reduce the possible oxidation of the contents to a minimum. The sealing of the saleable container prior to roasting prevents the escape of any of the volatile substances formed during the roasting process and hence all of the "aromatic principle" is retained in the container and will permeate the coffee so as to impart to it the desirable attributes of flavor, aroma and physiological effect.

It will be noted that the above described process of roasting differs widely from the established practice now generally followed in so far as the coffee is at no time exposed to the atmosphere from the time it is placed into the sealed container prior to roasting until it is opened by the ultimate consumer. In many instances, coffee is roasted in drums which are open to the atmosphere. In some instances the drum is sealed during the roasting process; but in all instances, save mine, the roasted coffee is exposed to the atmosphere subsequent to the completion of the roast. Obviously with such an exposure it is impossible to retain, in the coffee, all of the highly desirable "aromatic principle".

It will readily be understood from the foregoing that the preparation of coffee in accordance with my method accomplishes most desirable results, namely, the removal or control of the "astringent principle" in the raw bean, the retention of all of the "aromatic principle" in the roasted product, and the preparation of coffee in a salable container so as to insure to the user a product of superior quality.

It will also be understood that by means of my process, coffee may be roasted in its ground state, the most desirable for household use without the slightest fear of deterioration or loss of any of the "aromatic principle" by reason of any lapse of time between the date of roasting and the date of purchase or consumption. This is of real importance, by reason of the fact that prior to my invention, it was a well established fact that the ground product deteriorated far more rapidly than the whole bean.

While my process has been described in considerable detail in the foregoing specification, it is understood that various changes may be made in the process without departing from or sacrificing any of the advantages hereinafter claimed.

I claim:

1. The method of preparing coffee beans which consists in a preliminary heat treatment of the raw bean to remove the arstingent constituents, without volatilizing the aromatic constituents, and in roasting the bean thus treated in sealed containers ready for delivery to the consumers whereby the aromatic constituents are retained therein.

2. The method of preparing coffee beans which consists in a preliminary treatment of the raw bean in subjecting the bean to a heat of elevated temperature but lower than roasting temperature to volatilize and remove the astringent constituents after volatilizing the aromatic constituents, and in roasting the bean thus treated in sealed containers ready for delivery to the consumers whereby the aromatic constituents are retained therein.

3. The method of preparing coffee beans which consists in a preliminary heat treatment of the raw bean to remove the astringent constituents, without volatilizing the aromatic constituents, placing the coffee in individual containers for delivery to the consumers, removing as much air as feasible from said containers to reduce the possible oxidation of the contents, sealing said containers and in roasting the bean thus treated in said sealed containers whereby the aromatic constituents are retained therein.

GEORGE L. N. MEYER.